(12) United States Patent
Kedem (10) Patent No.: US 9,098,203 B1
(45) Date of Patent: Aug. 4, 2015

(54) MULTI-INPUT MEMORY COMMAND PRIORITIZATION

(71) Applicant: Marvell Israel (M.I.S.L.) Ltd., Yokneam (IL)

(72) Inventor: Ron Kedem, Petach Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 160 days.

(21) Appl. No.: 13/681,124

(22) Filed: Nov. 19, 2012

Related U.S. Application Data (60) Provisional application No. 61/561,382, filed on Nov. 18, 2011.

(51) Int. Cl.
| | |
|---|---|
| G06F 12/00 | (2006.01) |
| G06F 3/06 | (2006.01) |
| G06F 13/26 | (2006.01) |
| G06F 13/18 | (2006.01) |

(52) U.S. Cl.
CPC .............. *G06F 3/061* (2013.01); *G06F 3/0659* (2013.01); *G06F 13/18* (2013.01); *G06F 13/26* (2013.01)

(58) Field of Classification Search
None
See application file for complete search history.

(56) References Cited

U.S. PATENT DOCUMENTS

| | | | |
|---|---|---|---|
| 4,574,351 A | 3/1986 | Dang et al. | |
| 4,612,612 A | 9/1986 | Woffinden et al. | |
| 4,682,281 A | 7/1987 | Woffinden et al. | |
| 5,315,707 A | 5/1994 | Seaman et al. | |
| 5,657,471 A | 8/1997 | Lary et al. | |
| 5,860,149 A | 1/1999 | Fiacco et al. | |
| 6,009,463 A | 12/1999 | Brandt et al. | |
| 6,078,993 A | 6/2000 | Iwata et al. | |
| 6,112,265 A | 8/2000 | Harriman et al. | |
| 6,282,589 B1 | 8/2001 | Porterfield et al. | |
| 6,343,351 B1 | 1/2002 | Lackman et al. | |
| 6,378,052 B1 | 4/2002 | Genduso et al. | |
| 6,487,640 B1 | 11/2002 | Lipasti | |
| 6,647,423 B2 | 11/2003 | Regnier et al. | |
| 6,654,860 B1 | 11/2003 | Strongin et al. | |
| 6,918,005 B1 | 7/2005 | Marchant et al. | |
| 6,963,924 B1 | 11/2005 | Huang et al. | |
| 7,093,094 B2 | 8/2006 | Cismas | |
| 7,234,039 B1 | 6/2007 | Righi et al. | |
| 7,430,623 B2 | 9/2008 | Walls et al. | |

(Continued)

FOREIGN PATENT DOCUMENTS

| | | |
|---|---|---|
| CN | 1226704 A | 8/1999 |
| CN | 1617107 A | 5/2005 |

(Continued)

OTHER PUBLICATIONS

Taylor et al., "System-onChip Packet Processor for an Experimental Network Services Platform", Globecom 2003, IEEE, pp. 3933-3937.

*Primary Examiner* — Midys Rojas (57) ABSTRACT

Embodiments of the present disclosure provide a method and system for prioritizing memory commands. A priority determination engine determines a priority of a memory access command based on a plurality of inputs related to characteristics of the memory access command and a plurality of inputs related to a state of the memory. An access scheduler selects an order in which to issues the memory commands based at least on the priority. The priority determination is determined such that bandwidth utilization is improved.

19 Claims, 6 Drawing Sheets

(56) References Cited

U.S. PATENT DOCUMENTS

| | | |
|---|---|---|
| 7,600,131 B1 | 10/2009 | Krishna et al. |
| 7,664,938 B1 | 2/2010 | Tripathi et al. |
| 7,813,342 B2 | 10/2010 | Gadelrab |
| 7,818,389 B1 | 10/2010 | Chiang et al. |
| 7,877,524 B1 | 1/2011 | Annem et al. |
| 7,889,734 B1 | 2/2011 | Hendel et al. |
| 7,930,451 B2 | 4/2011 | Chen et al. |
| 8,250,322 B2 | 8/2012 | Huang et al. |
| 2004/0184470 A1 | 9/2004 | Holden |
| 2004/0268044 A1 | 12/2004 | Heller, Jr. et al. |
| 2005/0021913 A1 | 1/2005 | Heller, Jr. |
| 2005/0193158 A1 | 9/2005 | Srinivasan et al. |
| 2005/0198464 A1 | 9/2005 | Sokolov |
| 2005/0256976 A1 | 11/2005 | Susairaj et al. |
| 2005/0286513 A1 | 12/2005 | King |
| 2006/0004941 A1 | 1/2006 | Shah et al. |
| 2006/0026342 A1* | 2/2006 | Calvignac et al. ............ 711/105 |
| 2006/0045090 A1 | 3/2006 | Ronciak et al. |
| 2006/0179333 A1 | 8/2006 | Brittain et al. |
| 2006/0236063 A1 | 10/2006 | Hausauer et al. |
| 2006/0288134 A1 | 12/2006 | Baker et al. |
| 2007/0081538 A1 | 4/2007 | Ganji |
| 2008/0005405 A1 | 1/2008 | Innis et al. |
| 2008/0109613 A1 | 5/2008 | Jarosh et al. |
| 2008/0112415 A1 | 5/2008 | Sobaje |
| 2008/0228871 A1 | 9/2008 | Sano |
| 2008/0232374 A1 | 9/2008 | Kopelman et al. |
| 2008/0240111 A1 | 10/2008 | Gadelrab |
| 2008/0279208 A1 | 11/2008 | Walls et al. |
| 2009/0083392 A1 | 3/2009 | Wong et al. |
| 2009/0086733 A1 | 4/2009 | Barrack et al. |
| 2010/0118885 A1 | 5/2010 | Congdon |
| 2011/0072162 A1 | 3/2011 | Rysavy |
| 2011/0296063 A1 | 12/2011 | Pais et al. |
| 2012/0218890 A1 | 8/2012 | Gerkis |
| 2012/0219002 A1 | 8/2012 | Sobaje |
| 2012/0317360 A1 | 12/2012 | Zettler et al. |
| 2012/0331227 A1 | 12/2012 | Saripalli |
| 2014/0153575 A1 | 6/2014 | Munoz |

FOREIGN PATENT DOCUMENTS

| | | |
|---|---|---|
| CN | 1682502 A | 10/2005 |
| CN | 1922591 A | 2/2007 |
| JP | H05173953 A | 7/1993 |
| JP | H07202946 A | 8/1995 |
| JP | 2002278834 | 9/2002 |
| JP | 2005018772 A | 1/2005 |
| JP | 2006513510 A | 4/2006 |

* cited by examiner

MULTI-INPUT MEMORY COMMAND PRIORITIZATION

CROSS REFERENCE TO RELATED APPLICATIONS

The present disclosure claims priority to U.S. Provisional Patent Application No. 61/561,382, filed on Nov. 18, 2011, which is incorporated herein by reference.

This application is related to U.S. Non-Provisional patent application Ser. No. 13/071,229, filed on Mar. 24, 2011, which is incorporated herein by reference.

This application is related to U.S. Non-Provisional patent application Ser. No. 13/038,258, filed on Mar. 1, 2011, which is incorporated herein by reference.

TECHNICAL FIELD

Embodiments of the present disclosure relate to the field of digital memories, and in particular to prioritizing memory access commands.

BACKGROUND

The background description provided herein is for the purpose of generally presenting the context of the disclosure. Work of the presently named inventor, to the extent that it is described in this background section, as well as aspects of the description that does not otherwise qualify as prior art at the time of filing, are neither expressly nor impliedly admitted as prior art against the present disclosure.

Double data rate type three synchronous dynamic random access memory (DDR3 SDRAM) is a memory interface specification. One advantage of DDR3 SDRAM is the ability to transfer data at eight times the speed of the DRAM's internal memory arrays. Once a row is opened in the memory, the row is accessed at up to 100% utilization of the memory's internal bandwidth. But there are various overhead penalties associated with certain access scenarios in DDR3 SDRAM. A typical DDR3 SDRAM has eight internal memory banks, each with perhaps 2000 pages or rows. Every time a new row is opened within a memory bank, an open row within the memory bank is first closed, which impacts the performance of the SDRAM. It takes nine cycles to open up a new page in a DDR3 SDRAM. Other access patterns also result in overhead penalties. Thus, random access of DDR3 SDRAM results in real-world performance that is less than the theoretical maximum throughput and bandwidth. Bank interleaving, is a partial solution to this problem.

SUMMARY

In an embodiment, the present disclosure provides a system comprising a buffer configured to hold a queued plurality of memory access commands and a priority determination engine that is configured to determine a memory access command priority based at least on first inputs related to characteristics of the memory access command and on second inputs related to a state of a memory. An access scheduler selects an order for the plurality of memory access commands to be issued to the memory based at least on the determined priority of the memory access command. The second inputs are determined from a history of memory access, and include one or more of a memory page accessed according to the previously issued command, a bank accessed according to the previously issued command, a chip select accessed according to the previously issued command, or a command type of the previously issued command, or other. The priority determination engine determines the priority based at least further on a comparison of at least one of the first inputs to a corresponding one of the second inputs, and applies user-configurable weights to results of the comparisons.

In a further embodiment, the present disclosure provides a method comprising receiving a plurality of memory access commands that correspond to a plurality of memory operations to be performed on a memory. A priority for one of the memory access commands is determined based at least on first inputs related to characteristics of the one of the memory access commands and second inputs related to a state of a memory bus of the memory. A next one of the plurality of memory access commands to be issued to the memory bus is determined based at least on the determined priority. The priority is determined at least in part by comparing at least a first one of the first inputs to a corresponding first one of the second inputs and applying a weight to a result of the comparing. The state of the memory bus includes one or more of information regarding open or closed memory banks, information regarding open or closed memory pages, information regarding a recently accessed dual in-line memory module, information regarding a command type of a recently issued memory access command. The characteristics of the one of the memory access commands includes one or more of information regarding a memory bank to be accessed according to the at least one of the memory access commands, information regarding a memory page to be accessed according to the at least one of the memory access commands, information regarding a dual in-line memory module to be accessed according to the at least one of the memory access commands, information regarding a command type of the at least one of the memory access commands.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Embodiments of the present disclosure utilize a multi-input memory access command prioritization scheme to determine an order that commands are sent to a memory bus.

A priority determination engine determines a priority metric for commands based on inputs related to access command characteristics and inputs related to a state of a memory. A scheduler submits the commands to the memory by determining which memory access commands have the highest priorities.

The prioritization scheme described herein is used, in various embodiments, with DDR2 and DDR3 SDRAM. In these memory schemes, there are certain overhead penalties associated with different access patterns. For example, opening a closed row in a bank that presently has an open row results in more overhead than opening a closed row in a different bank. Likewise, two consecutive read commands, or two consecutive write commands, result in less access overhead than a read followed by a write or a write followed by a read. Embodiments of the present disclosure arrange the order in which the memory commands are issued to the memory in order to reduce the overhead penalties, and increase the throughput.

A priority determination engine determines, from characteristics of the memory commands, the state of a memory bus, and/or access scenarios determined from the command characteristics and the state of the memory bus, a priority metric associated with the memory command. The priority metric represents a relative approximation of the amount of overhead associated with issuing the memory access command to the memory. Various weights associated with the characteristics of the memory command, the state of the memory bus, and/or the access scenarios are fed into an algorithm to arrive at the priority metric. The weights represent relative overheads associated with the various characteristics. In this way, memory access commands that, in light of the state of the memory bus, have characteristics that represent relatively high overhead are given a relatively high priority by the priority determination engine. Issuing these commands before other commands results in higher bandwidth utilization of the memory bus.

Figure 1:
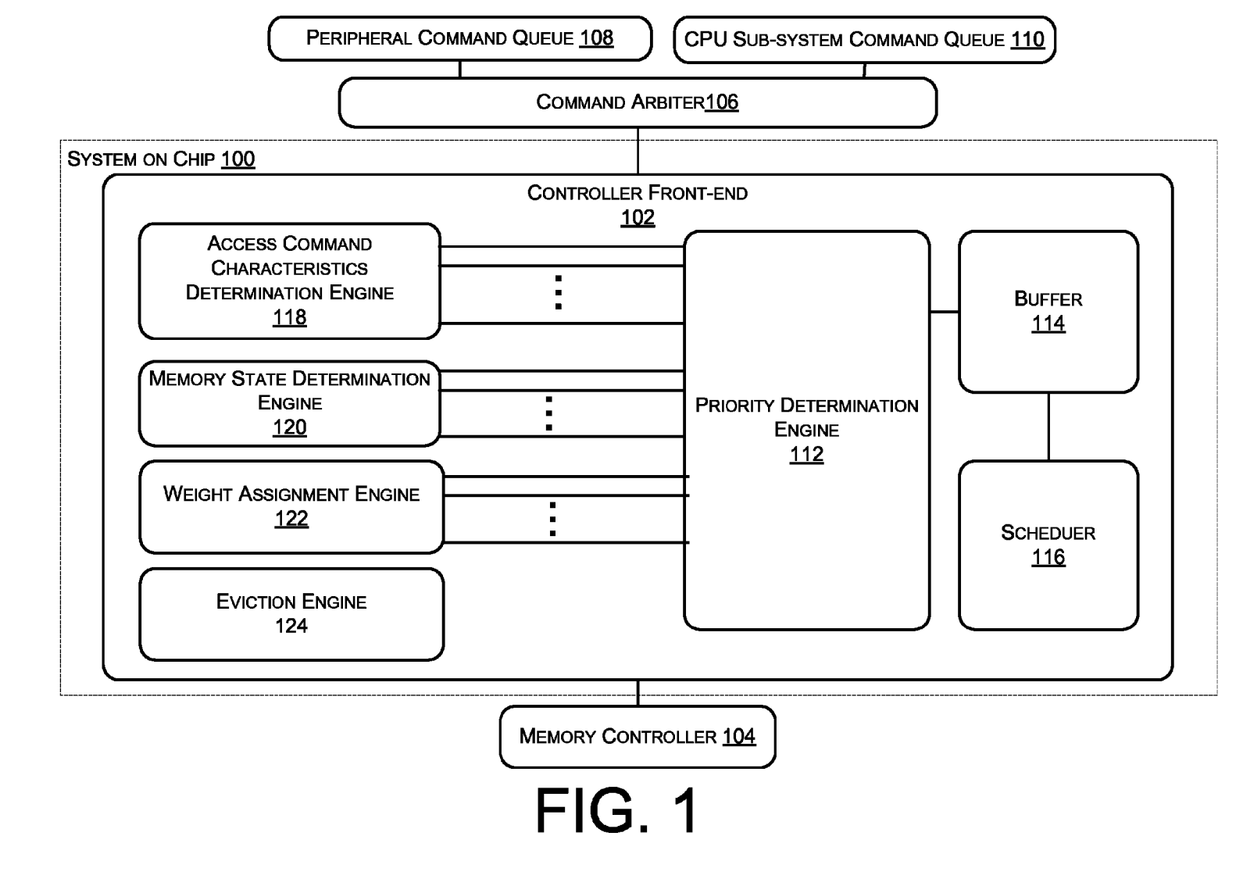
FIG. 1 schematically illustrates a system on a chip (SoC) utilizing a multi-input memory access command priority scheme, in accordance with an embodiment.

FIG. 1 schematically illustrates a system on a chip (SoC) 100 utilizing a multi-input memory access command priority scheme for accessing a memory (not illustrated in FIG. 1). The SoC 100 includes a controller front-end 102, which fronts a memory controller 104. The SoC 100 is coupled to a command arbiter 106, which is situated between the SoC 100 and various command queues, such as the peripheral command queue 108, such as a crossbar command queue, and the central processing unit (CPU) sub-system command queue 110. In various embodiments, one or more of the memory controller 104, the command arbiter 106, the peripheral command queue 108, and the CPU sub-system command queue 110 is part of the SoC 100. In some embodiments a memory (not illustrated), such as a DDR3 SDRAM or a DDR2 SDRAM, is also part of the SoC 100. The controller front-end 102 includes a priority determination engine 112, a buffer 114, and a scheduler 116. As memory access commands are received by the controller front-end 102 from the command arbiter 106, they are stored in the buffer 114. The buffer 114 is, in some embodiments, comprised of a plurality of bank queues, such as a sub-queue for each bank of a memory device, which are command buffers, as are described in more detail below. Each sub-buffer of the buffer 114 has a corresponding priority determination engine 112, access command characteristics determination engine 118, memory state determination engine 120, weight assignment engine 122, and eviction engine 124.

The priority determination engine 112 determines priorities for the memory access commands in the buffer 114. The priorities are determined based on access command characteristics, a state of a memory bus (not illustrated in FIG. 1), and various weights that are applied to the command characteristics, the state of the memory bus, and/or access scenarios that are determined based on the command characteristics and the state of the memory bus. An access command characteristics determination engine 118 determines various characteristics of the access command and outputs them to the priority determination engine 112. Priorities are determined based on a sub-buffer status as well, using certain configurable thresholds to control the number of buffer entries that should be evicted to the memory in each point in time. Thus, when a sub-buffer reaches a certain threshold number of command entries, these entries are assigned with high priority for quick eviction, in order to prevent the buffer from being filled up and prevent back-pressure backwards to the CPU.

Access command characteristics include information regarding a memory bank and/or a memory page of a memory device (illustrated in FIG. 2) to be accessed according to at least one of the memory access commands. This information is determined from a memory address associated with the memory access command, in an embodiment. The access command characteristics includes information regarding a Chip Select (CS) (e.g., a dual in-line memory module (DIMM)) to be accessed according to the at least one of the memory access commands. A CS is a separate DRAM socket that is controlled by the SoC 100.

The access command characteristics includes, in an embodiment, information regarding a command type of the at least one of the memory access commands, such as a read command, a write command, a read-before-write command, or other command type. This information is determined based on the memory access command itself.

In addition to access commands received via the command arbiter 106, the buffer 114 also includes commands provided by a prefetch engine (described elsewhere within this Detailed Description). A prefetch command is a predictive forward-looking command that is determined based on a history of accesses by the prefetch engine. The access command characteristics determination engine 118 determines that a memory access command is a prefetch command and input this information to the priority determination engine 112. Other command characteristics may also be determined and input to the priority determination engine 112.

The memory state determination module 120 determines information regarding the state of the memory bus and inputs the information to the priority determination engine 112. The state of the memory bus is determined based on a history of memory access. For example, the state of the memory bus is determined based on a recently issued access command, a command next in line for submission to the memory controller 104, data from the memory itself, or other. Thus, the state of the memory bus is not necessarily the state of the memory bus as it exists at the time that the priority is determined, but is based on knowledge of what the state of the memory bus will be at the time just before the next memory access command issued from the controller front-end 102 is placed on the memory bus.

The information regarding the state of the memory bus, which is determined from characteristics of a previously issued command, includes a memory page or a memory bank that is open or recently accessed, or a memory page or bank that is closed. This information is determined, for example, based on a memory address associated with a previously issued command (the address is used to determine the bank and page that are currently or will be accessed). The information regarding the state of the memory bus includes a CS accessed, based for example on the previously issued command. The memory addresses of CSs are stored in a table that is referenced to determine whether the command accesses a CS and, if so, which CS is being accessed. The information regarding the state of the memory bus includes a command type of the previously issued command, such as a read command, a write command, a read-before-write command, and so forth.

The weight assignment engine 122 assigns weights to various characteristics of the memory access commands, the state of the memory bus, and/or access scenarios determined from the memory access commands and the state of the memory bus. The weights represent a relative overhead penalty associated with those characteristics, states, and scenarios. As discussed above, in one example consecutive access to an open page in DDR3 SDRAM is preferred over access to a closed page in the same bank (it could be that access to a closed page in a different bank is preferred over an access to an open page in a different bank, for the purpose of enhancing or maximizing bank interleaving). Thus, there is a weight assigned to the scenario of consecutive access to an open page, and the weight is relatively high compared to a weight assigned to a different memory access scenario such as consecutive reads and/or consecutive writes.

The priority determination engine 112 compares the characteristics of a particular access command to the state of the memory bus (which may be based on characteristics of a previously issued command) to determine which access scenarios are true (consecutive access to open memory page of the same or different bank, consecutive read commands, consecutive write commands, consecutive access to the same CS, and so forth). Where the comparison determines that one or more scenarios are true, the priority determination engine 112 computes the priority metric based on the associated weights for the true access scenarios. The priority determination engine 112 writes the priority metric to the row in the queue of the buffer 114 that includes the memory access command, and the scheduler 116 determines the next memory command to issue based at least on the priority metrics. Thus, in embodiments, the priority metrics represents the relative absolute value of the overhead penalty (or lack thereof) associated with the memory command.

The weight assignment engine 122 also outputs weights for other aspects of the memory access commands, such as whether the command is a read command or a write command (read commands is preferred over write commands, or vice versa), the age of the command, and so forth. In a particular example, two memory commands that are both to open pages in the same bank that is presently accessed are given different priorities because one of the commands is older, because one of the commands is a read command and the other is a write command, and so forth.

The weights are user-programmable, static, or dynamic. For example, the weight assignment engine 122 determines the weights dynamically based on observation of memory access times or based on other means.

The scheduler 116 issues the commands to the memory controller 104 in an order that is based on the priority metrics assigned to the memory commands. The priority metric reflects a number of commands in a sub-buffer of the buffer 114 exceeding a threshold. The priority metric also reflects an age of one or more commands in the buffer 114 exceeds an age threshold. An eviction engine 124 determines the age and/or the number of commands in the sub-buffer of the buffer 114 and provides inputs to the priority determination engine 112 to enable the priority determination engine 112 to determine the appropriate priority based on age and/or number of commands in the sub-buffer.

The priority determination engine 112 applies a system priority in determining the priority metric for a given memory access command. For example, there is a system priority that prioritizes commands coming from the CPU sub-system command queue 110 over commands from the peripheral command queue 108, or vice versa. There is a system priority for commands of a certain type (read, write, and so forth). They is also a system priority for certain components, such as a first CPU being preferred over a second CPU. A priority metric determined by the priority determination engine 112 includes bits that correspond to the system priority, and other bits that correspond to the weights applied to the scenarios of the memory access commands (weighted bus priority). In other embodiments, the priority metric is a composite value calculated from both types of priority information. In embodiments that utilize separate bits for system and weighted bus priority, the scheduler 116 schedules commands for issuance based firstly on system priority bits, and secondly based on weighted bus priority. In other embodiments, the system priority is used as a tie-breaker, with the weighted bus priority given first consideration by the scheduler 116. In embodiments, the most-significant bits are the system priority, while the least significant bits represent the weighted bus priority. In alternative embodiments, the most significant bits are the weighted bus priority and the system priority is represented by the least significant bits.

Once one or more of the memory commands are issued to the memory controller by the scheduler 116, the priority determination engine 112 re-calculates the priority metrics of the memory commands that remain within the buffer 14. This is because the priority metrics depend on the state of the memory bus, and the state of the memory bus changes based on issuance of new memory access commands to the memory bus. For example, a new page is opened, a new memory access command type is issued, and so forth. Thus, a command with second-highest priority may not be issued second following on a recalculation of its priority metric following issuance of the highest priority command from the buffer 114.

Figure 2:
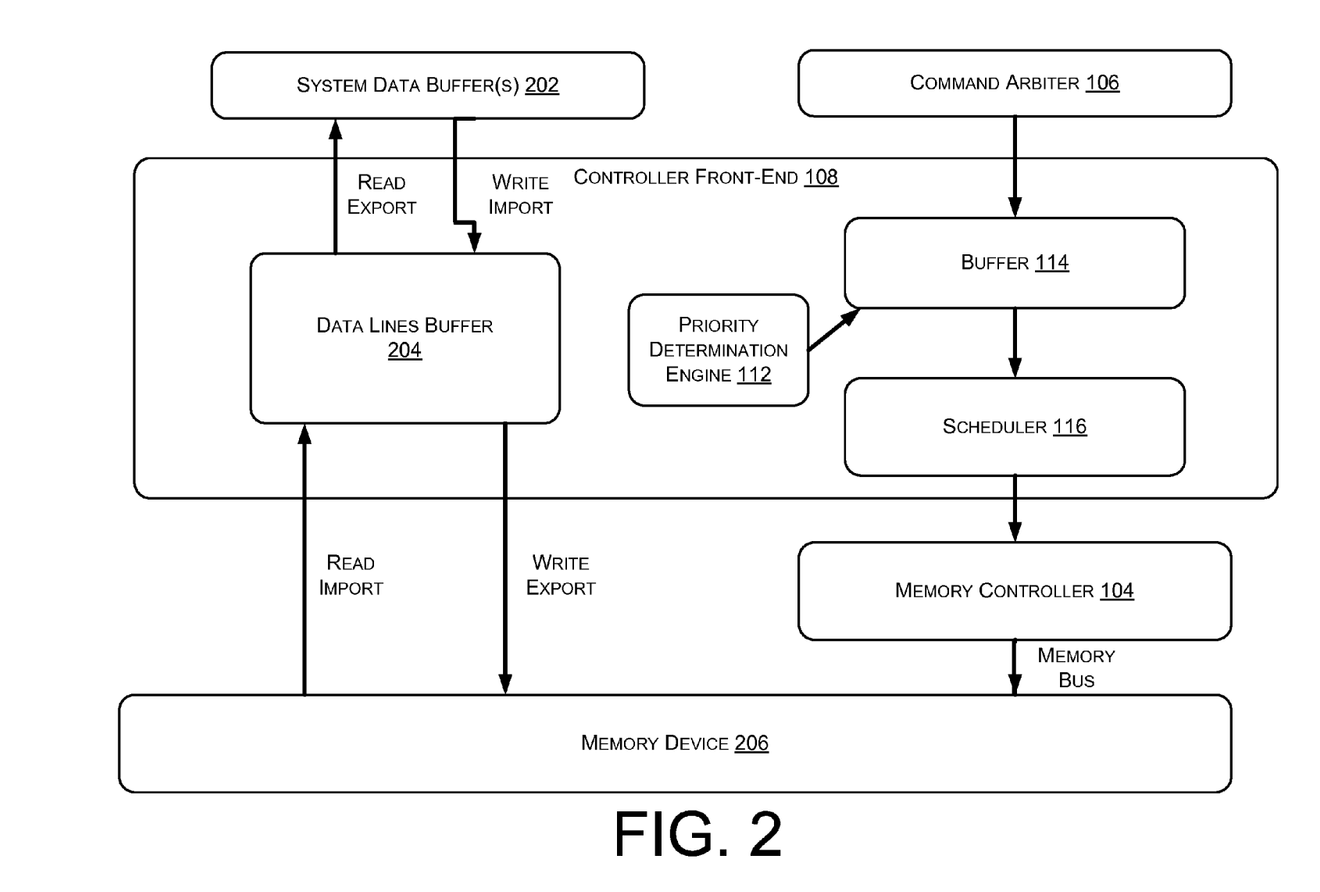
FIG. 2 schematically illustrates interactions between components in a SoC with a multi-input memory access command priority scheme, in accordance with an embodiment.

FIG. 2 schematically illustrates interactions between components in a SoC 100 with a multi-input memory access command priority scheme. The command arbiter 106 issues commands, and their respective addresses within a memory device 206 (which may or may not be included within the SoC 100 depending on the application), to the buffer. Based on the priority metrics determined by the priority determination engine 112, the scheduler 116 selects commands to be next issued to the memory controller 104. The data associated with a write command placed in the buffer 114 is provided to the controller front-end 102 by the system data buffers 202, and stored temporarily in the data lines buffer 204. Once the write command is issued to the memory controller 104 (and on to the memory device 206), the data in the data lines buffer 204 associated with the write command are exported to the memory device 206. The data associated with a read command are imported to the controller front-end 102, and stored in the data lines buffer 204, before being placed in the system data buffers 202. The data read from the memory may be associated with one or more prefetch commands. Also, each command entry in the buffer 114 has a corresponding single line of data in the data lines buffer 204; either a single line of data to be written to the memory device 206 or a single line of data read from the memory device 206.

Figure 3:
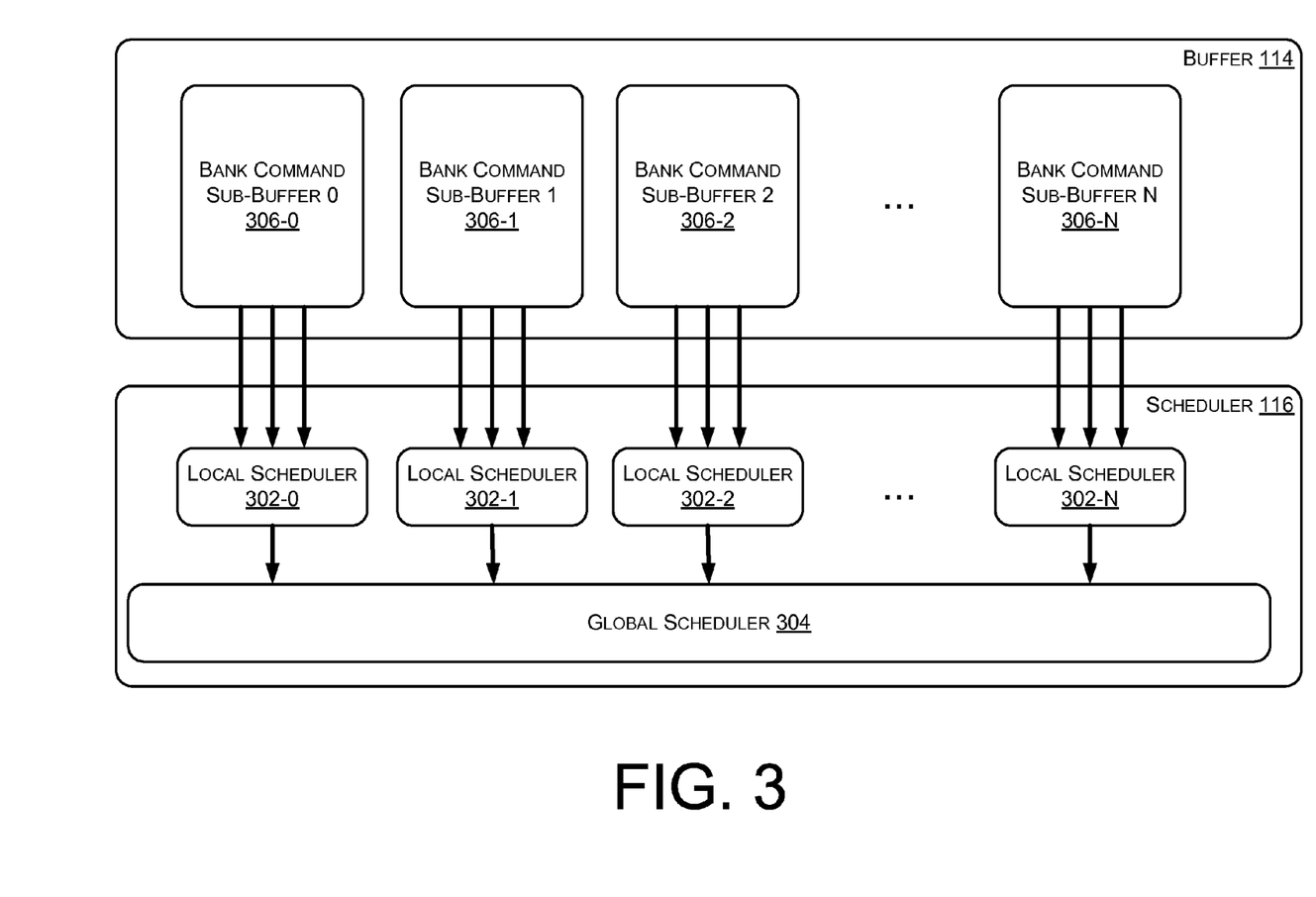
FIG. 3 schematically illustrates the interaction between local schedulers and a global scheduler in a SoC with a multi-input memory access command priority scheme, in accordance with an embodiment.

FIG. 3 schematically illustrates the interaction between local schedulers 302 and a global scheduler 304 in a SoC with a multi-input memory access command priority scheme. The buffer 114 includes N+1 bank command sub-buffers 306, and the memory device has N+1 banks, such as eight banks. (And each sub bank has M entries.) In one example, each bank contains 2000 pages, while each sub-buffer within the banks contains a smaller number of pages, such as M=16. Moreover, each command entry can point to a different 128 byte data segment in the same DRAM page. The scheduler 116 includes local schedulers 302 and a global scheduler 304, where each bank command sub-buffer 306 has a corresponding local scheduler 302. Each local scheduler 302 selects the highest priority memory access command within their respective bank command sub-buffers 306, and presents it to the global scheduler 304. The global scheduler 304 causes one or more of the memory access commands provided by the local schedulers 302 to be issued to the memory controller, such as the memory controller 104. The global scheduler 304 issues the commands in a round-robin fashion, or based on their relative priorities (system priority, weighted priority, or both). The global scheduler 304 issues the commands in parallel, depending on the memory interface specification being used.

Once one or more of the memory commands are issued to the memory controller by the global scheduler 304, the priority determination engine 112 re-calculates the priority metrics of the memory commands that remain within the bank command sub-buffers 306. This is because the priority metrics depend on the state of the memory bus, and the state of the memory bus changes based on issuance of new memory access commands to the memory. For example, a new page is opened, a new memory access command type is issued, and so forth.

Figure 4:
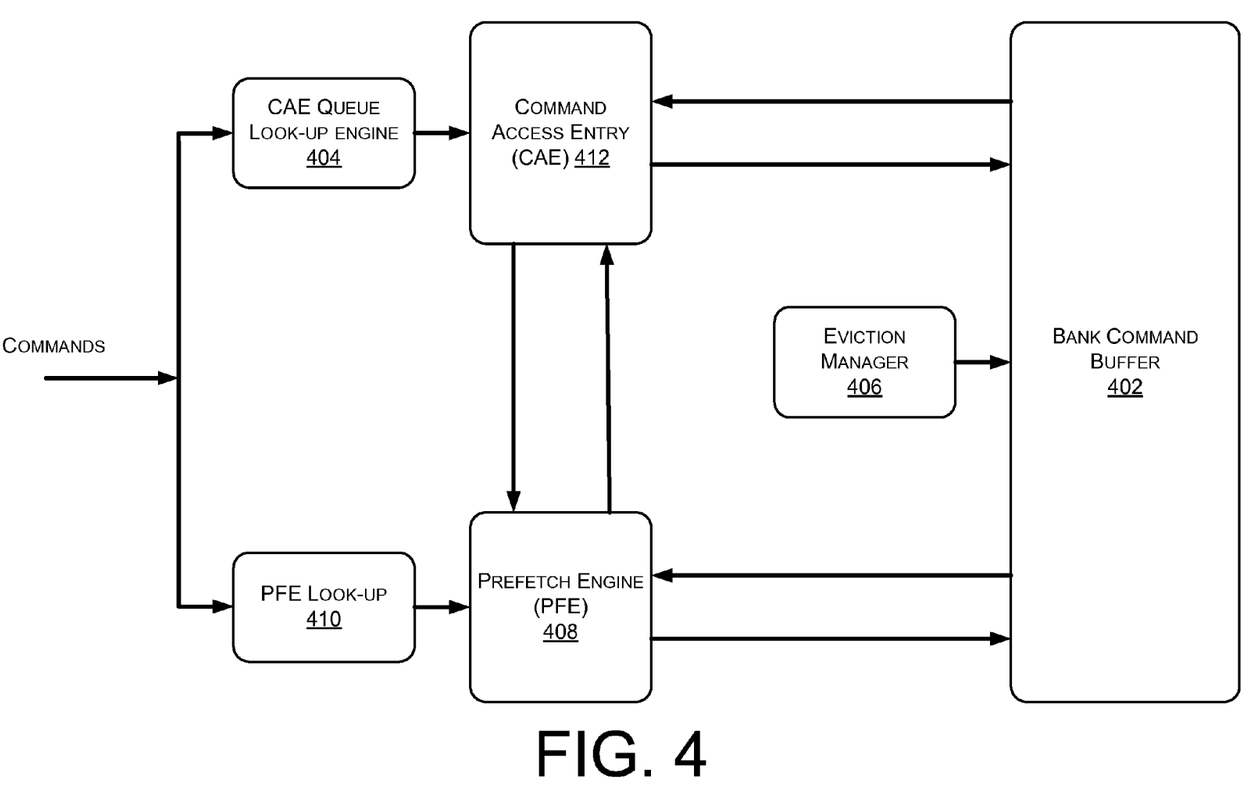
FIG. 4 schematically illustrates components of a SoC with a multi-input memory access command priority scheme, in accordance with an embodiment.

FIG. 4 schematically illustrates components of a SoC with a multi-input memory access command priority scheme. The CAE queue look-up engine 404 and the command access entry 412 are used as an input stage of buffer, and address certain buffer hazard scenarios (such as lookup hits in the buffer.) The bank command sub-buffer 402 is a bank-specific queue, such as one of the bank command sub-buffers 306 of FIG. 3. When a command arrives in the bank command sub-buffer 402, the command access entry (CAE) queue look-up engine 404 searches the queue to determine if another command already in the bank command sub-buffer 402 shares an address with the new command. If there is a hit, the CAE queue look-up engine 404 determines whether the commands are ordered based on their states. For example, a write command issued to a memory address is performed prior to a later-received read command to the same memory address. If the commands are ordered, then the priority determination engine within the bank command sub-buffer 402 gives the first command a higher priority (e.g., a priority metric that indicates higher priority than the second command).

The eviction manager 406 determines takes into consideration configurable thresholds for determining the queue filling status, and if so, causes the priority determination engine within the bank command sub-buffer 402 to give one or more of the command entries in the bank command sub-buffers 402 to be given a higher priority metric.

The prefetch engine (PFE) 408 makes a prediction as to a memory command (address and command type) that will be received. For example, if a memory access command is issued to access address 0, the prefetch engine 408 predicts that a memory access command to access address 1 will be received, and generate a prefetch read command to be placed into the bank command sub-buffers 402. The prefetch read command is eventually issued to the memory. Once the data corresponding to the prefetch read command is received, it is saved in the data buffer (such as the data lines buffer 204), and marked as "valid" because it is identical to the data in the DRAM. The PFE look-up 410 determines whether a newly received command matches a previously issued prefetch command; if so, then the "valid" line data is returned to the device that requested the data without having to read from the DRAM. This reduces the latency or reads and reduces the number of DRAM accesses in general.

A CAE 412 determines priorities of the commands as they arrive at the priority determination engine 400, in accordance with processes described elsewhere within this Detailed Description.

Figure 5:
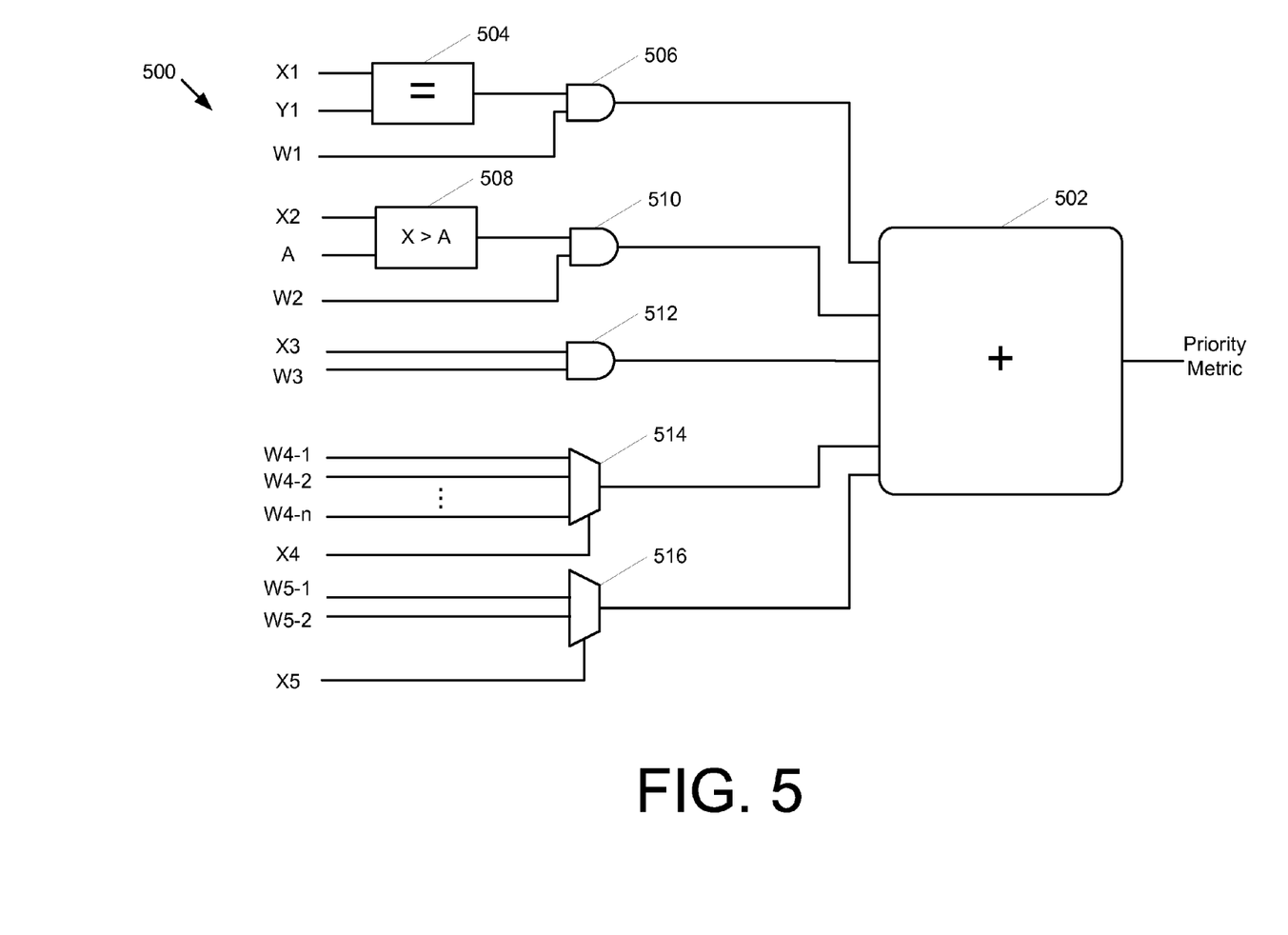
FIG. 5 illustrates a circuit for implementing a multi-input memory access command priority scheme, in accordance with an embodiment.

FIG. 5 illustrates an example circuit 500 for implementing a multi-input memory access command priority scheme. The circuit 500 is part of a priority determination engine, such as the priority determination engine 112 and the priority determination engine 400. Inputs X related to characteristics of the memory access command are received as inputs into the circuit 500. Inputs Y related to a state of the memory bus are received as inputs to the circuit 500. Various weights W are also received.

The circuit 500 includes logic to determine which weights W are to be summed by adder 502 in order to determine a priority metric for the memory access command. For example, the circuit 500 includes one or more compare circuits 504. Compare circuit 504 accepts X1 and Y1 as input and outputs a binary "1" if the inputs are the same. The multiplier 506 accepts weight W1 and the output of the compare circuit 504 as input, and outputs a result of the multiplication of the two inputs. In this way, the compare circuit 504 compares a characteristic of the memory access command to a state of the memory bus—which is based on a characteristic of a previously issued command—and if the result of the compare is true, then weight W1 is forwarded to the adder 502. Examples of X1 inputs include a CS identifier (if any), a page accessed by the memory access command (or a portion of the memory address that identifies the memory page), a command type (read, write, read-before-write, etc.), and so forth. Examples of Y1 inputs include a CS (if any), a page accessed by a command on the memory bus, a command type of a command on the memory bus, and so forth. Circuit 500 is shown with only one compare circuit 504, but embodiments include more than one compare circuit 504, such that more than one example of possible X1 and Y1 inputs—such as those listed above—is input into the circuit 500 and be given weight.

In one example of the operation of compare circuit 504, if X1 indicates the memory page accessed by the command, Y1 indicates a page being accessed by a command on the memory bus, and X1=Y1, then weight W1 is forwarded to the adder 502. In other words, if the access scenario of next issuing the memory command to the memory includes a consecutive access of an open memory page (determined because X1=Y1), then the weight W1 is used to determine the priority metric for the memory command.

The circuit 500 also includes compare circuit 508, which accepts as input X2 and Y2. If X2 is greater than A, then the compare circuit 508 outputs a binary "1". The multiplier 510 multiplies the output of the compare circuit 508 with the weight W2. Thus, if the result of the compare is true, then the weight W2 is forwarded to the adder 502 to increase the priority metric. An example X2 input is an age of the memory access command (e.g., the amount of time it has been in the bank queue). If the age X2 is greater than a threshold age A, then the weight W2 is forwarded to the adder 502. Thus, commands in the bank queue having an age that exceeds threshold A are given higher priority than commands having an age that do not exceed the threshold A.

Multiplier 512 multiplies input X3 directly with weight W3, and forwards the result to the adder 502. An example input X3 indicates that the command is a prefetch command; thus if the memory access command is a prefetch command, then the prefetch weight W3 is forwarded to the adder 502.

Multiplexer 514 accepts weights W4-1 through W4-n, as well as memory access command characteristic input X4, as inputs. Based on the value of X4, one of weights W4-1 to W4-n are selected and forward to adder 502. Example inputs X4 include a CS accessed by the memory command, a tag identifier associated with the memory command, a page associated with the memory command, and so forth. This enables the circuit to attach different weights (W4-1 through W4-n) to different pages within a bank, different CSs, different tags applied to the commands in the queue, and so forth. This is different than, for example, determining if there is a consecutive page access or (in another example) determining that there is a consecutive read command. The logic of multiplexer 514 enables the circuit 500 to prioritize a particular page over other pages (in one example) regardless of whether there has been a consecutive read to that page or not. In a specific example, if X4 indicates that the memory access command is for page 9 within the bank queue, then a weight associated with that particular page is forwarded to the adder 502.

Similarly, multiplexer 516 accepts weights W5-1 and W5-2 as inputs, along with memory access command characteristic X5. Based on the value of X5, one of the weights W5-1 and W5-2 are selected and forwarded to the adder 502. Example inputs X5 include a memory command type (e.g., read or write commands), such that if the memory access command is a read command, it is given a first weight and if the memory access command is a write command, then it is given a different weight. One of inputs X1 and X5 may be the same input.

The priority metric output from the adder 502 is a summation of all weights that are forwarded to the adder 502. In one example, the weights are numbers from zero to four, and the priority metric is a three-bit number, thus having a minimum value of zero and a maximum value of seven. The adder 502 is configured to output a maximum value in the event that the sum of all weights selected for the memory access command exceeds the maximum value. In some embodiments, something other (or in addition to) adder 502 is utilized to determine the priority metric, such as a multiplier, a divider, a subractor, a multiplexor, and so forth.

The example shown in FIG. 5 is an example only, and other configurations for a circuit may be implemented without departing from the scope of embodiments. Also, circuit 500 may be implemented as an application-specific integrated circuit (ASIC), as a programmable circuit, such as a field-programmable gate array (FPGA), or other circuit type. In some embodiments, the logic of circuit 500 is implemented as software executing on a processor.

In the same or different implementation as illustrated in FIG. 5, the following table represents the priority metric calculation according to embodiments of the present disclosure.

| Bit Number | Field Description |
|---|---|
| 4:3 | Command Original Priority (COP) |
| 2:0 | Weighted Bus Optimization (WBO) |
| | WBO ! = 0: |
| | (Scs * W) + |
| | (Scmd * W) + |
| | ([~Sb & ~Sp) or (Sb & Sp) or (~Sb & Sp)]*W) + |
| | ([RDcmd or WRcmd] * W) |
| | WBO = 0: |

-continued

| Bit Number | Field Description |
|---|---|
| | Med - 3'b001 |
| | Low or (~Low & ~Med) -3'b000 |

Where: Scs=Same CS as previous command; Scmd=Same Command as previous command; Sb=Same Bank as previous command; Sp=Same Page as previous command; WBO=Weighted Bus Optimization; W=configurable weights.

Bits 4:3 of the priority metric reflect the command's original high/top priority, modified such that priority is given to accessing a different page and a different bank. Bits 2:0 of the priority metric represent the WBO; if the WBO value equals zero, then the commands original low/med priority is assigned as the priority metric.

Figure 6:
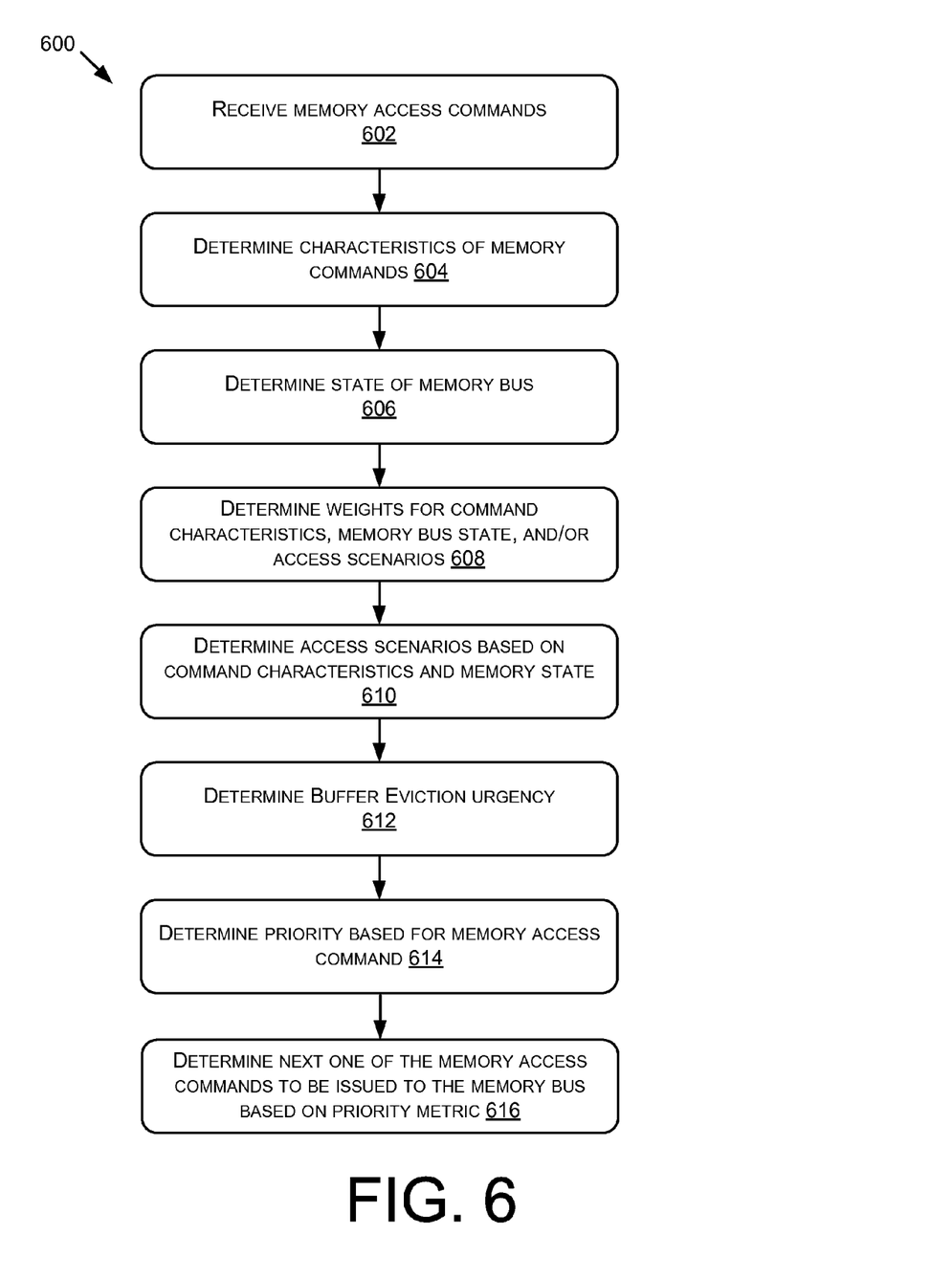
FIG. 6 illustrates a process of determining memory access command priority according to various embodiments.

FIG. 6 illustrates a process 600 of determining memory access command priority according to various embodiments. At 602 a buffer, such as the buffer 114 of the controller front-end 102, receives a plurality of memory access commands that correspond to a plurality of memory operations to be performed on a memory. The memory may be a DDR2 or DDR3 SDRAM, or some other type of memory. The access commands are associated with memory addresses that identify a bank, row, and word to be accessed. The access commands include various read commands, write commands, prefetch commands (which are read commands), and so forth.

At 604, an access command characteristics determination engine, such as the access command characteristics determination engine 118, determines information regarding the characteristics of the memory access commands in the buffer. Characteristics include a memory bank and page accessed, a command type of the command (e.g., a read command, a write command, a prefetch command, a read-before-write command, and so forth), a CS (if any) accessed by the command, an age of the command, or other.

At 606, a memory state determination engine, such as the memory state determination engine 120, determines information regarding a state of the memory bus. The state of the memory bus is determined based on characteristics of another access command, such as previously issued command, a command to be next issued. The state of the memory is also based on some other information, such as data provided by a memory controller or the memory itself. Information regarding the state of the memory bus includes banks accessed, pages that are open or being accessed, a command type of a command on the memory bus (read, write, prefetch, and so forth), a CS accessed by a command on the memory bus, and so forth.

At 608, a weight assignment engine determines weights to be applied to memory access command characteristics, characteristics regarding the state of the memory bus, and/or access scenarios determined based on access command characteristics and state of the memory bus. The weights correspond at least in part on a relative magnitude of a memory access overhead penalty that is associated with the characteristics. The weights may be user-programmable, dynamically assigned based on access overheads observed, or the weights may be static.

At 610, a priority determination engine, such as the priority determination engine 112, determines one or more access scenarios based on command characteristics and the state of the memory. Determination of the access scenarios is accomplished by comparing the characteristics of the state of the memory to the characteristics of the access command.

At 612, an eviction manager determines a sub-buffer eviction urgency and priority based on buffer status, such as by using configurable thresholds for a number of entries in the sub-buffer and/or an age of the entries in the sub-buffer.

At 614, a priority determination engine, such as the priority determination engine 112, determines a priority for one of the memory access commands based at least on first inputs related to characteristics of the one of the memory access commands and second inputs related to a state of a memory bus of the memory. The priority metric is based on weights associated with the memory access command characteristics, characteristics of the state of the memory bus, and/or the access scenarios determined based on the access command characteristics and the state of the memory bus. For those characteristics and access scenarios that apply to the access command given a state of the memory bus (e.g., those characteristics and/or access scenarios that are "true"), the weights associated with those characteristics are used to determine the priority metric, such as by summing the weights together to arrive at a priority metric, or using some other algorithm or calculation.

At 616, a scheduler, such as the scheduler 116, determines, based at least on the determined priority, a next one of the plurality of memory access commands to be issued to the memory bus.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)."

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A system on a chip comprising:
   a buffer configured to hold a queued plurality of memory access commands;
   a priority determination engine that is configured to determine a priority of a memory access command of the plurality of memory access commands in the queue, and to determine the priority based at least on a weight that is indicative of a magnitude of a memory access overhead penalty of the memory access command; and
   an access scheduler configured to select an order for the plurality of memory access commands to be issued to the memory based at least on the corresponding priority of the memory access command.

2. The system on a chip of claim 1, wherein the priority determination engine is further configured to determine the priority of the memory access command based at least on first inputs related to characteristics of the memory access command and on second inputs related to a state of a memory, wherein the second inputs related to the state of the memory are determined at least from a history of memory access.

3. The system on a chip of claim 1, wherein the priority determination engine is further configured to determine the priority of the memory access command based at least on first inputs related to characteristics of the memory access command and on second inputs related to a state of a memory, wherein the second inputs related to the state of the memory are determined at least from characteristics of a previously issued command, wherein the characteristics of the previously issued command include one or more of a memory page accessed according to the previously issued command, a bank accessed according to the previously issued command, a chip select accessed according to the previously issued command, or a command type of the previously issued command.

4. The system on a chip of claim 1, wherein the priority determination engine is further configured to determine the priority of the memory access command based at least on first inputs related to characteristics of the memory access command and on second inputs related to a state of a memory, wherein the state of the memory includes one or more of a state of a memory bank or a state of a memory row.

5. The system on a chip of claim 1, wherein the priority determination engine is further configured to determine the priority of the memory access command based at least on first inputs related to characteristics of the memory access command and on second inputs related to a state of a memory, wherein the state of the memory includes one or more of:
   information regarding one or more open memory banks;
   information regarding one or more closed memory banks;
   information regarding one or more open memory pages; or
   information regarding one or more closed memory pages.

6. The system on a chip of claim 1, wherein the priority determination engine is further configured to determine the priority based at least further on first inputs related to characteristics of the memory access command, second inputs related to a state of a memory, and a comparison of at least one of the first inputs to a corresponding one of the second inputs.

7. The system on a chip of claim 6, wherein the priority determination engine is further configured to apply the weight to a result of the comparison.

8. The system on a chip of claim 1, wherein the weight is user-programmable.

9. The system on chip of claim 1, wherein the weight is a first weight, the magnitude is a first magnitude, the memory access overhead penalty is a first memory access overhead penalty associated with a first characteristic of the memory access command, and the priority determination engine is further configured to:
   determine the priority of the memory access command based at least on first inputs related to characteristics of the memory access command and on second inputs related to a state of a memory, the characteristics of the memory access command including the first characteristic;

compare a first one of the first inputs related to the first characteristic of the memory access command to a corresponding first one of the second inputs to determine a first comparison result;

compare a second one of the first inputs related to a second characteristic of the memory access command to a corresponding second one of the second inputs to determine a second comparison result;

multiply the first comparison result by the first weight to determine a first product;

multiply the second comparison result by a second weight to determine a second product, the second weight indicative of a second magnitude of a second memory access overhead penalty associated with the second characteristic of the memory access command; and sum at least the first product and the second product to determine the priority.

10. The system on a chip of claim 9, wherein the priority determination engine is further configured to select a third weight based on a third one of the first inputs, and sum the third weight, the first product, and the second product to determine the priority.

11. The system on a chip of claim 1, wherein the buffer is divided into a plurality of queues, wherein ones of the queues correspond to ones of a plurality of banks of the memory.

12. A method comprising:
receiving a plurality of memory access commands that correspond to a plurality of memory operations to be performed on a memory;

determining a priority for one of the memory access commands based at least on a weight that is indicative of a magnitude of a memory access overhead penalty of the memory access command; and based at least on the determined priority, determining a next one of the plurality of memory access commands to be issued to the memory bus.

13. The method of claim 12, further comprising determining the priority based further on first inputs related to characteristics of the one of the memory access commands and second inputs related to a state of a memory bus of the memory, wherein the second inputs related to the state of the memory bus are determined at least from characteristics of a previously issued command.

14. The method of claim 12, further comprising determining the priority based further on first inputs related to characteristics of the one of the memory access commands and second inputs related to a state of a memory bus of the memory, including comparing at least a first one of the first inputs to a corresponding first one of the second inputs and applying the weight to a result of the comparing.

15. The method of claim 14, wherein the memory is a double data rate 3 synchronous dynamic random-access memory (DDR3 SDRAM).

16. The method of claim 12, wherein the weight is configurable.

17. The method of claim 14, wherein the result of the comparing indicates an access scenario, including at least one of:
consecutive access to an open page of a memory bank;
access to a closed page of a different memory bank;
consecutive access to a dual in-line memory module; and
consecutive read operations or consecutive write operations.

18. The method of claim 12, wherein the state of the memory bus includes one or more of:
information regarding open or closed memory banks;
information regarding open or closed memory pages;
information regarding a recently accessed dual in-line memory module or
information regarding a command type of a recently issued memory access command.

19. The method of claim 12, further comprising determining the priority based further on first inputs related to characteristics of the one of the memory access commands and second inputs related to a state of a memory bus of the memory, wherein the characteristics of the one of the memory access commands includes one or more of:
information regarding a memory bank to be accessed according to the at least one of the memory access commands;
information regarding a memory page to be accessed according to the at least one of the memory access commands;
information regarding a dual in-line memory module to be accessed according to the at least one of the memory access commands; and
information regarding a command type of the at least one of the memory access commands.

* * * * *